US008662366B1

(12) United States Patent
DeZonia et al.

(10) Patent No.: US 8,662,366 B1
(45) Date of Patent: Mar. 4, 2014

(54) LADDER RACK FOR A VEHICLE

(76) Inventors: Dudley DeZonia, Los Angeles, CA (US); Rodney Monroe, Philadelphia, PA (US); Marc San Paolo, Lakewood, CA (US)

( * ) Notice: Subject to any disclaimer, the term of this patent is extended or adjusted under 35 U.S.C. 154(b) by 684 days.

(21) Appl. No.: 12/535,774

(22) Filed: Aug. 5, 2009
(Under 37 CFR 1.47)

(51) Int. Cl.
*B60R 9/04* (2006.01)

(52) U.S. Cl.
USPC ............... 224/405; 224/403; 296/3; 403/177; 403/337

(58) Field of Classification Search
USPC .............. 224/402–405, 529, 530, 532; 296/3; 403/177, 337; 211/191, 204, 206
See application file for complete search history.

(56) References Cited

U.S. PATENT DOCUMENTS

| 3,765,713 | A | * | 10/1973 | Suitt | 296/3 |
| 4,057,281 | A | * | 11/1977 | Garrett | 296/3 |
| 4,398,763 | A | * | 8/1983 | Louw | 296/3 |
| 4,405,170 | A | * | 9/1983 | Raya | 296/10 |
| 5,152,570 | A | * | 10/1992 | Hood | 296/3 |
| 5,423,587 | A | * | 6/1995 | Ingram | 296/3 |
| 5,476,301 | A | * | 12/1995 | Berkich | 296/3 |
| 5,494,327 | A | * | 2/1996 | Derecktor | 296/3 |
| 5,628,540 | A | * | 5/1997 | James | 296/3 |
| 5,836,635 | A | * | 11/1998 | Dorman | 296/3 |
| 5,927,782 | A | * | 7/1999 | Olms | 296/3 |
| 6,752,301 | B1 | * | 6/2004 | Drolet | 224/405 |
| 7,758,091 | B1 | * | 7/2010 | McCall | 296/3 |
| 7,946,457 | B2 | * | 5/2011 | Kramer | 224/405 |
| 2002/0163214 | A1 | * | 11/2002 | Carter | 296/3 |
| 2004/0026945 | A1 | * | 2/2004 | Kench et al. | 296/3 |
| 2006/0163300 | A1 | * | 7/2006 | Kramer | 224/405 |
| 2009/0166390 | A1 | * | 7/2009 | Flaherty | 224/405 |

OTHER PUBLICATIONS

Picture of prior art ladder rack for a vehicle.

* cited by examiner

*Primary Examiner* — Brian D Nash
*Assistant Examiner* — Corey Skurdal
(74) *Attorney, Agent, or Firm* — Novak Druce Connolly Bove + Quigg LLP

(57) ABSTRACT

A ladder rack for a vehicle having a cab and a cargo area behind the cab. The rack has two front and two rear upwardly extending legs affixed to the cargo area proximally to and distally from the cab, respectively. Two side sections extending between longitudinally adjacent front and rear legs, respectively; and front overhang sections extending from the front legs, respectively, over and displaced above the cab. The sections each including an upper bar assembly, a lower bar and an attachment for attaching the sections to an adjacent leg. Each of the attachments has a plate and fasteners, the upper bar assemblies and lower bars being end abutting against one or more plates, being fixed to the plates and being displaced from one another at the plates. The plates extend between the upper bar assemblies and the lower bars and outwardly beyond each. The fasteners of the attachments are received by a plate and an adjacent leg beyond the upper bar assembly and the lower bars. Crossbars extend between the front overhang sections, front legs and the side sections. Vertical adjustment of some of the crossbars is provided.

5 Claims, 6 Drawing Sheets

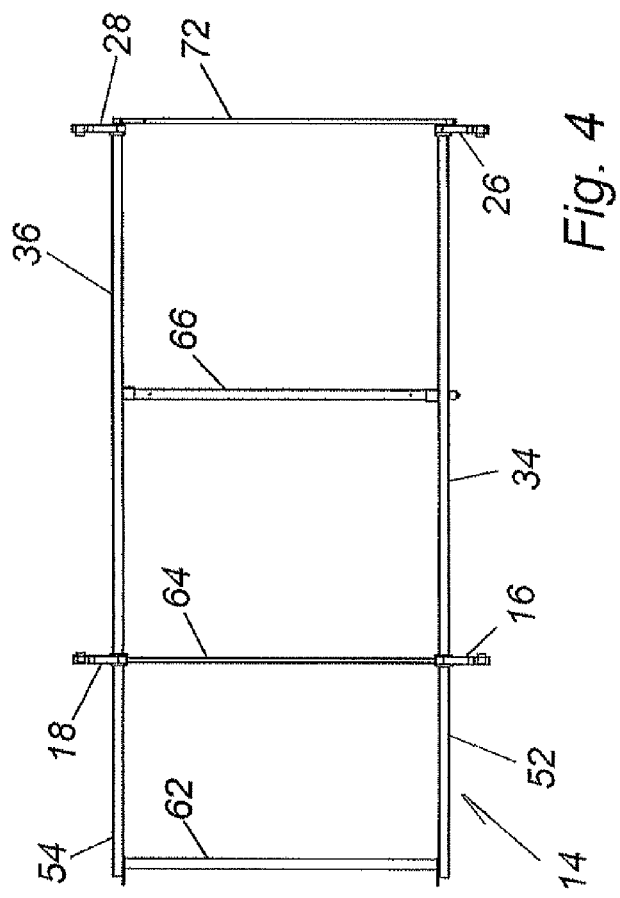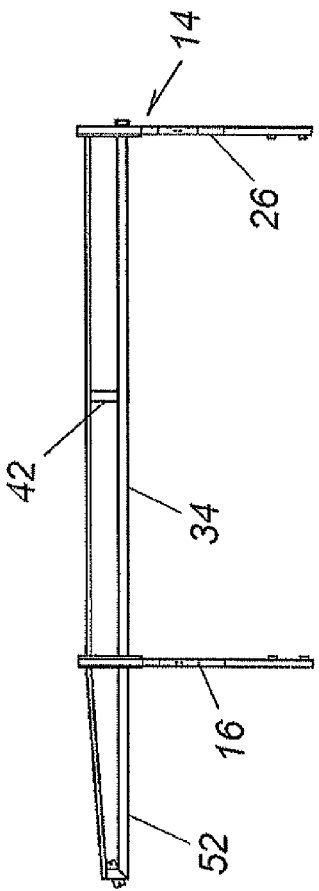

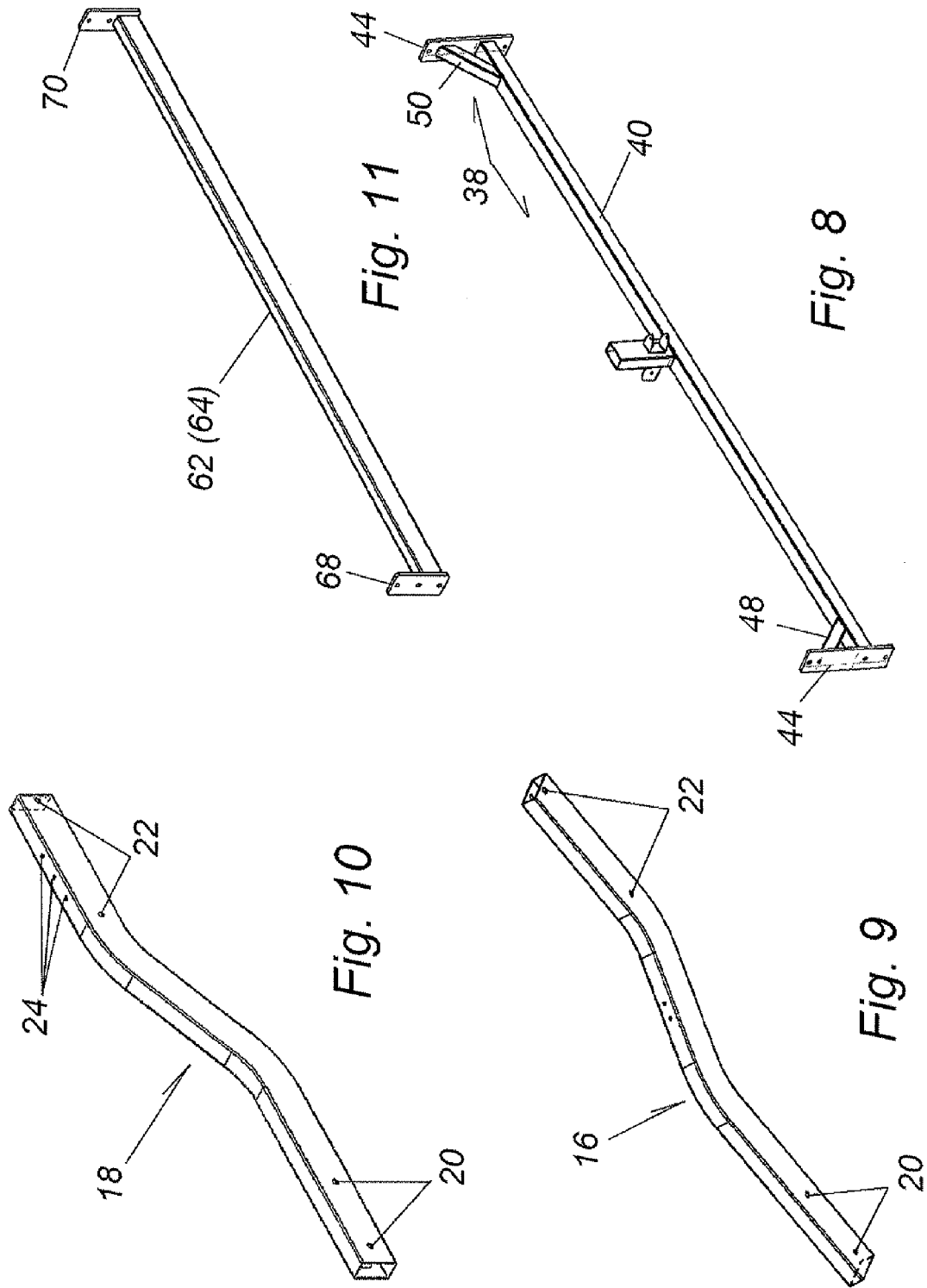

US 8,662,366 B1

LADDER RACK FOR A VEHICLE

BACKGROUND OF THE INVENTION

The field of the present invention is elevated rack structures associated with utility type trucks frequently referred to by those skilled in the art as ladder racks.

The truck service body industry fabricates a wide variety of truck bodies employed on trucks from small pickups to bobtails and beyond. The bodies frequently include a bed with cabinets along either side, enclosed compartments and the like. For many utility applications, elongate equipment such as ladders are used. Therefore, such truck bodies frequently include elevated racks which extend upwardly to receive ladders and other elongate items which do not fit in the cargo area.

Ladder racks are typically supported on upstanding legs attached to a cargo area behind the vehicle cab. These racks frequently extend the length of the bed and as a cantilevered section over the cab forwardly of the cargo area. They are typically welded structures added as one piece to the vehicle. Such racks are typically designed to provide substantial rigidity and strength and yet need to be open structures to allow access to the cargo area and specific elements forming parts of the truck body.

SUMMARY OF THE INVENTION

The present invention is directed to a ladder rack for a vehicle. The rack includes front legs affixed to the cargo area proximally to the cab and rear legs similarly affixed distally from the cab. Side sections extend between the upwardly extending legs and front overhang sections are cantilevered forwardly over the vehicle cab.

In a first separate aspect of the present invention, the front overhang sections each include an upper bar, a lower bar and an attachment for attaching the front overhang section to the adjacent upwardly extending leg. The attachment includes a plate affixed to the adjacent leg by fasteners. The plate extends between the upper and lower bars and further extends outwardly beyond each to receive the fasteners. The plate extensions accommodated by the upwardly extending legs do increase the size and extent of the rack structure. The increase does not typically interfere with access to the other components of the truck body. At the same time, the plate arrangements in association with the fasteners provide substantial rigidity and strength such that appropriate loads are easily accommodated. The resulting modular arrangement also enhances the ability to accommodate a variety of configurations and preassembly packaging.

In a second separate aspect of the present invention, the attachments described in the first separate aspect of the present invention are applied to the side sections to equal advantage.

In a third separate aspect of the present invention, the upwardly extending legs of the ladder rack include a plurality of attachment locations vertically spaced to accommodate crossbars extending therebetween.

In a fourth separate aspect of the present invention, any of the foregoing separate aspects are contemplated to be combined to greater advantage.

Thus, an object of the present invention is an improved ladder rack for vehicles having a cab and cargo area behind the cab. Other and further objects and advantages will appear hereinafter.

BRIEF DESCRIPTION OF THE DRAWINGS

FIG. 3 is a side view of the ladder rack of FIG. 2.
FIG. 4 is a plan view of the ladder rack of FIG. 2.
FIG. 5 is an end view of the ladder rack of FIG. 2.
FIG. 8 is a perspective view of an alternate side section.
FIG. 9 is a perspective view of an upwardly extending leg.
FIG. 10 is a perspective view of an upwardly extending leg.
FIG. 11 is a perspective view of a forward or mid crossbar.

DETAILED DESCRIPTION OF THE PREFERRED EMBODIMENTS

Figure 1:
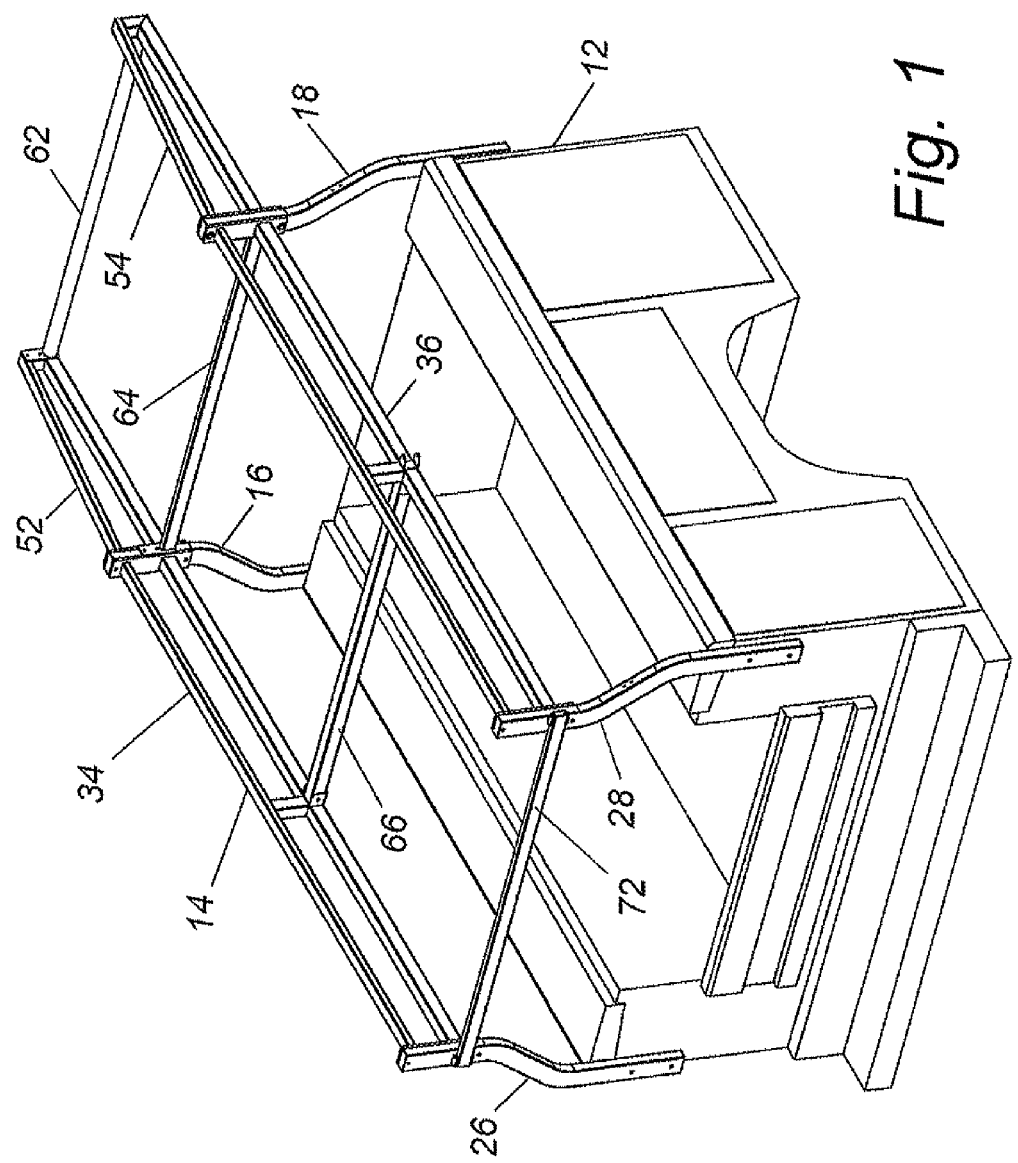
FIG. 1 is a perspective view of a ladder rack on a vehicle.
Figure 2:
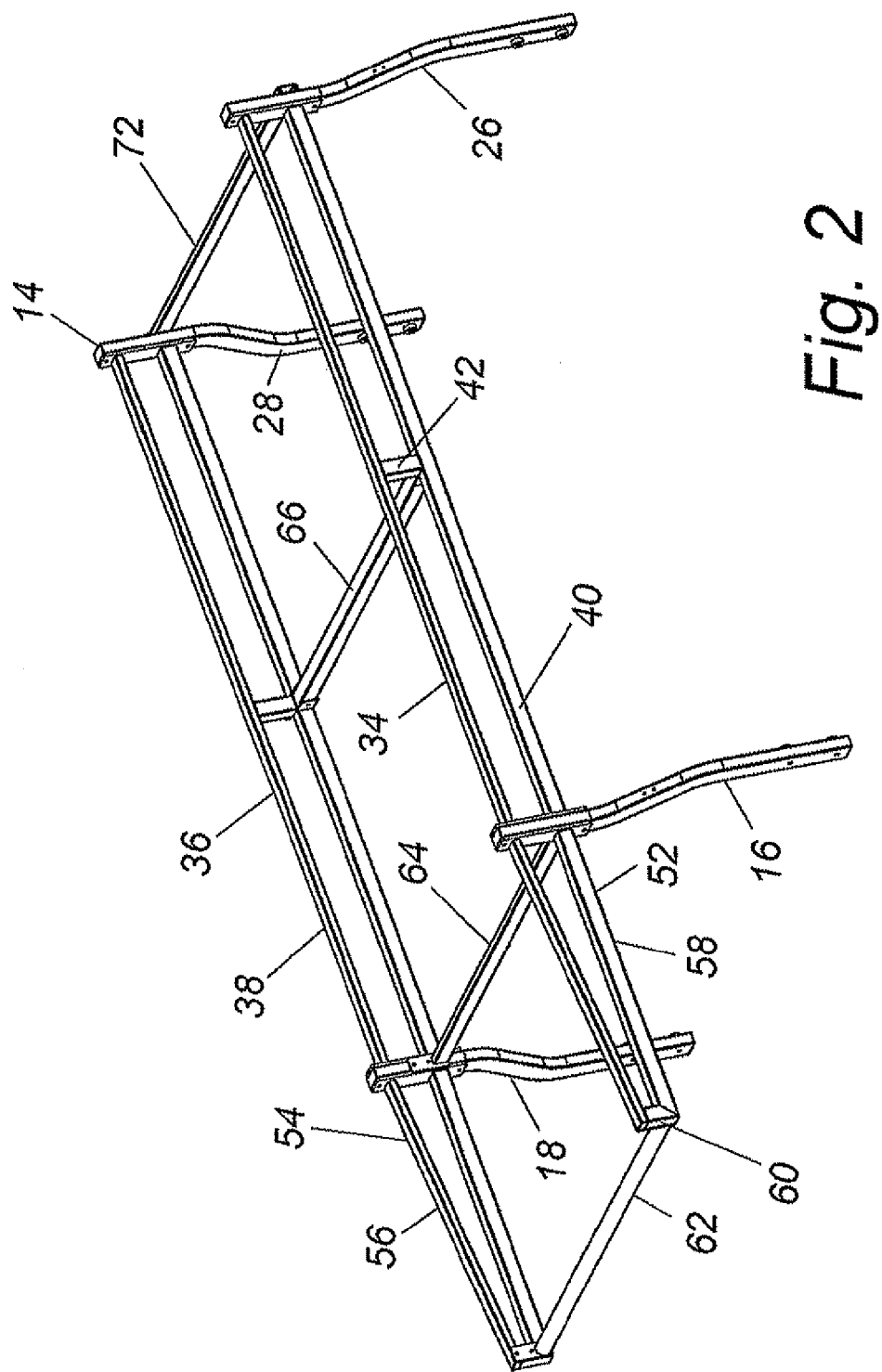
FIG. 2 is a perspective view of a ladder rack.
Figure 6:
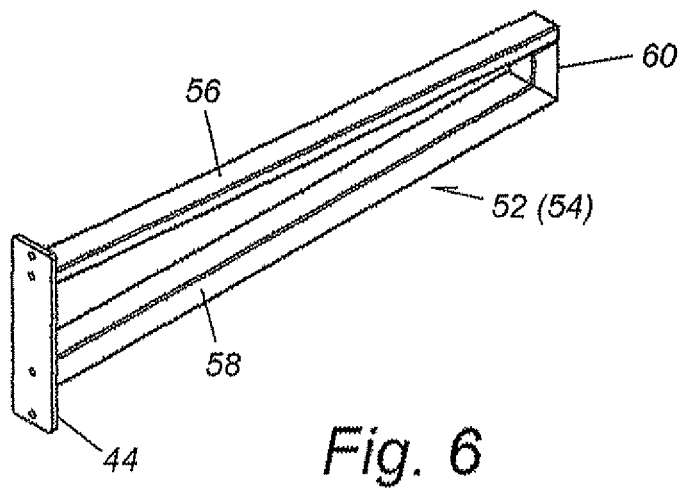
FIG. 6 is a perspective view of a front overhang section.

Turning in detail to the drawings, FIG. 1 illustrates one context in which a ladder rack is found on a vehicle. One example of a truck body 12 used in the cargo area is shown which is mounted to the vehicle behind a cab. FIGS. 2 through 5 illustrate a perspective view and orthogonal views of an assembled ladder rack 14.

The ladder rack 14 includes front legs 16, 18 affixed to the truck body 12 proximally to the cab end of the cargo area. The front legs 16, 18 are each bolted to the truck body 12 where substantial rigidity exists. The body 12 is appropriately designed to have mounting areas for this purpose. The legs 16, 18 are affixed to the front side of the body 12 to extend upwardly. A pattern of bolt holes 20 is provided through each of the front legs 16, 18 adjacent the lower ends for attachment to the body. The legs 16, 18 are mirror images of one another with the left side front leg 16 illustrated in FIG. 9 and the right side front leg 18 illustrated in FIG. 10. Each leg 16, 18 is a rectangular tube formed with a dogleg as seen in the drawings. The dogleg provides a broad mounting of the rack 14 with a narrower width above the vehicle to reduce side clearance requirements. At the upper end, another pattern of bolt holes 22 extends through each of the front legs 16, 18. Threaded holes 24 face inwardly on the front legs 16, 18. There are three threaded holes 24 vertically spaced with each hole an equal distance from the adjacent hole.

The ladder rack 14 further includes rear legs 26, 28 affixed to the truck body 12 distally from the cab 10. The rear legs 26, 28 are each also bolted to the truck body 12 where substantial rigidity exists. The legs 26, 28 are affixed to the back side of the body 12 to extend upwardly. A pattern of bolt holes is provided which is the same as provided through each of the front legs 16, 18 adjacent the lower end for attachment to the body. The legs 26, 28 are mirror images of one another with the right side back leg 28 similar to the left side front leg 16 illustrated in FIG. 9 and the left side back leg 26 similar to the right side front leg 18 illustrated in FIG. 10. Each leg 26, 28 is a rectangular tube formed with a dogleg as seen in the drawings. The doglegs provide the same advantage as provided with the front legs. At the upper end, another pattern of bolt holes extends through each of the rear legs 26, 28, just as through the front legs 16, 18.

Figure 7:
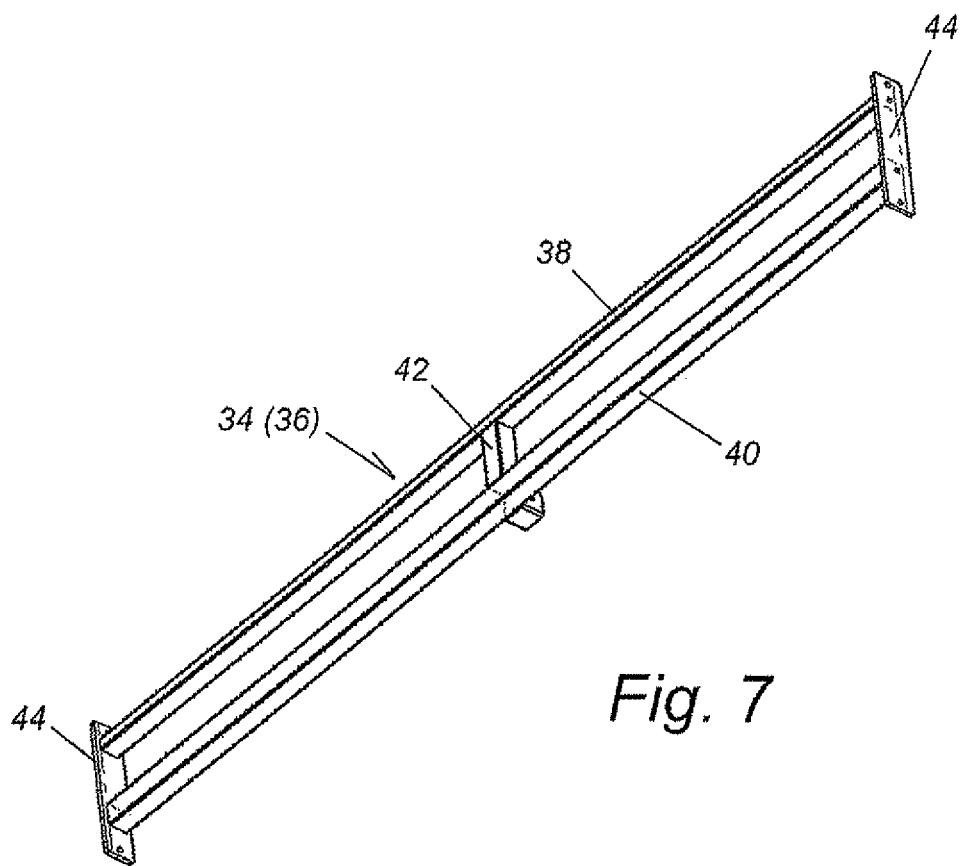
FIG. 7 is a perspective view of a side section.

Two side sections 34, 36 extend between the front legs 16, 18 and the rear legs 26, 28, respectively. One of the side sections 34, 36 is illustrated in FIG. 7. The side sections 34, 36 each include an upper side bar assembly which, in FIG. 7, is an upper side bar 38. A lower side bar 40 extends parallel to the bar 38 and a brace 42 extends between the upper side bar 38 and the lower side bar 40 approximately mid point of the side sections 34, 36.

Figure 12:
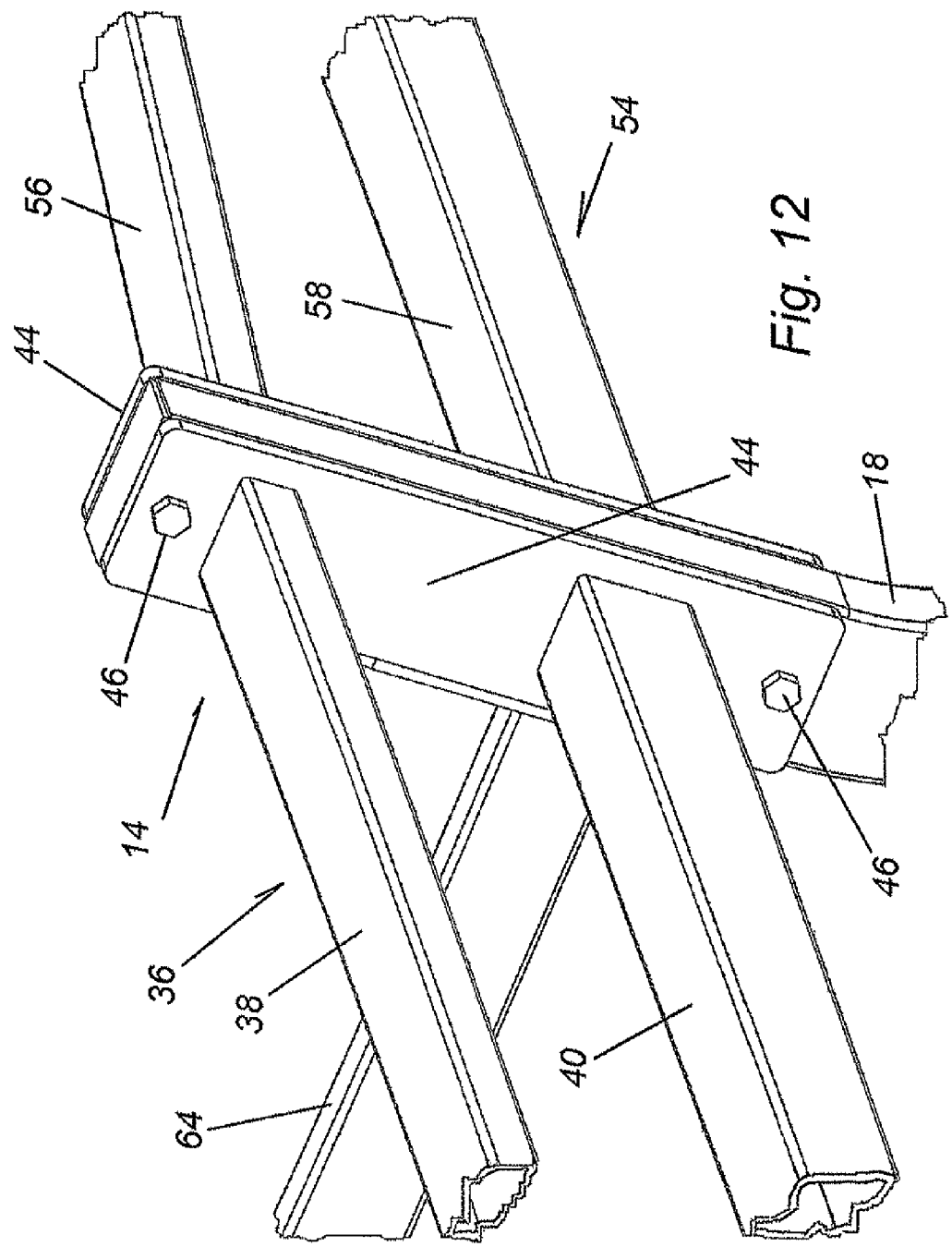
FIG. 12 is a perspective view of attachments on an upwardly extending leg.

The upper and lower side bars 38, 40 terminate at attachments which each include a plate 44 and fasteners 46, illustrated in detail in FIG. 12. The bars 38, 40 are end abutting at the plates 44 where they are fixed by welding. The bars 38, 40 are displaced from one another at the plates 44. With the end abutting plates 44, the two side sections 34, 36 extend between the longitudinally adjacent front and rear legs 16, 18, 26, 28.

An alternate embodiment of the side sections 34, 36 is illustrated in FIG. 8. In this alternate embodiment, the upper side bar assembly is composed of brace bars 48, 50. These brace bars 48, 50 are also mutually spaced at abutment with the plates 44. They extend to the lower side bars 40 to brace the attachment with the plates 44 and create a reduced profile to allow additional lateral access.

The plates 44 at either end of each of the side sections 34, 36, forming the attachments with the fasteners 46, extend between the upper and lower side bars 38, 40, or the upper brace bars 48, 50 and the lower side bars 40 in the second embodiment. They further extend outwardly beyond the bars to define bolt holes to receive fasteners 46 associated with the upper pattern of bolt holes 22 on the front and rear legs 16, 18, 26, 28. The front and rear legs 16, 18, 26, 28 have flat surfaces to receive the plates 44. In the preferred embodiment, the fasteners are bolts with nuts. With the wide spacing of the bolt pattern to receive the attachments, substantial rigidity is achieved. This rigidity and strength is without the need for welded joints or triangular bracing. This is advantageous for the open nature of the ladder rack with attachments to the body only at the lower end of the legs 16, 18, 26, 28.

Front overhang sections 52, 54 extend over and are displaced above the cab of the associated vehicle from the front legs 16, 18. Each front overhang section 52, 54 includes an upper cantilever bar 56 and a lower cantilever bar 58. The bars 56, 58 extend to short verticals 60, 62. The bars 56, 58 also abut in mutually displaced configuration against plates 44 of attachments which are conveniently the same as the attachments at either end of the side sections 34, 36. The lower cantilever bars 58 are angled toward the upper cantilever bars 56, respectively, to reduce stress on the forward junctions of the cantilevered structures.

The longitudinal assemblies of the front and rear legs 16, 18, 26, 28, the side sections 34, 36 and the front overhang sections 52, 54 are structurally tied together by laterally extending components including a forward crossbar 62, a mid crossbar 64 and a side section crossbar 66. The forward crossbar 62 includes a flange offset 68 to accommodate fasteners to engage threaded holes (not shown but see identical pattern of holes 24 on the front leg 16 illustrated in FIG. 10) at the forward junctions of the front overhang sections 52, 54.

The side section crossbar 66 is located in two three sided sockets, one associated with each of the side sections 34, 36. Pins retain the ends of the side section crossbar 66 in place. This mounting arrangement allows the side section crossbar 66 to be removed to accommodate larger loads in the cargo area. Greater or fewer crossbars may be used depending on anticipated forces.

The mid crossbar 64 engages the front legs 16, 18 at the threaded holes 24. As noted above, there are three vertically arranged holes 24. The mid crossbar 64 is able to engage the upper and middle holes 24 or the middle and lower holes 24. Each end of the mid crossbar 64 includes a flange offset 70 to accommodate fasteners to engage the holes 24. By selecting the holes 24 and the orientation of the mid crossbar 64, the mid crossbar 64 can be vertically positioned to accommodate either of the two configurations of the side sections describe herein. The forward crossbar 62 has the same vertical adjustment capability.

A gate bar 72 is pivoted at one end to the ladder rack and retained by a clevis and pin at the other end across the back of the ladder rack. The pivot for the gate bar 72 is located so that the bar 72 can swing from engagement with the clevis and pin across the back of the ladder rack to an engagement with the adjacent side section where another clevis is located to hold the gate in an open position.

With the modular construction of the legs, sections and crossbars, the structure can be advantageously assembled on the vehicle and even partially deconstructed to accommodate loads. Shipping of a ladder rack for remote assembly is also advantaged. These features are accommodated without compromise on structure rigidity through the attachments of the sections to the legs.

Thus, an improved ladder rack is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A ladder rack for a vehicle having a cab and a cargo area behind the cab, comprising
    front legs affixed to the cargo area proximally to the cab and extending upwardly therefrom;
    rear legs affixed to the cargo area distally from the cab and extending upwardly therefrom;
    front overhang sections extending from the front legs, respectively, over and displaced above the cab, the front overhang sections each including an upper bar, a lower bar and a front attachment for attaching the front overhang section to the adjacent leg, the front attachments each having a front plate and fasteners, the upper and lower bars of each of the front overhang sections being end abutting against and affixed to the corresponding front plate and being displaced from one another at the front plate, the front plate extending between the upper and lower bars and outwardly of each of the upper and lower bars longitudinally of the adjacent leg, the fasteners being receivable by the adjacent leg and by the front plate outwardly of the upper and lower bars;
    side sections extending between longitudinally adjacent front and rear legs, respectively, each side section including an upper side bar, a lower side bar and a side attachment for attachment of the side sections to the adjacent front leg, each of the side attachments having a side plate with the corresponding upper and lower side bars of each side section being end abutting against and fixed to the corresponding side plate and being displaced from one another at the side plate, the side plate extending between the upper and lower side bars and outwardly of each of the upper and lower side bars longitudinally of the adjacent front leg, the fasteners being received by the side plates and the adjacent front legs outwardly of the upper and lower side bars, the upper and lower side bars being affixed to the rear legs, respectively, the front plates and the side plates at each of the front legs being directly opposed across the adjacent front leg.

2. The ladder rack of claim 1 further comprising
    at least one crossbar extending between the front overhang sections and affixed thereto.

3. The ladder rack of claim 1, the fasteners being threaded bolts.

4. A ladder rack for a vehicle having a cab and a cargo area behind the cab, comprising
    front legs affixed to the cargo area proximally to the cab and extending upwardly therefrom;

rear legs affixed to the cargo area distally from the cab and extending upwardly therefrom;

front overhang sections extending from the front legs, respectively, over and displaced above the cab, the front overhang sections each including an upper bar, a lower bar and a front attachment for attaching the front overhang section to the adjacent leg, the front attachments each having a front plate and fasteners, the upper and lower bars of each of the front overhang sections being end abutting against and affixed to the corresponding front plate and being displaced from one another at the front plate, the front plate extending between the upper and lower bars and outwardly of each of the upper and lower bars longitudinally of the adjacent leg, the fasteners being receivable by the adjacent leg and by the front plate outwardly of the upper and lower bars;

side sections extending between longitudinally adjacent front and rear legs, respectively, each side section including a side bar, a brace bar and a side attachment for attachment of the side section to the adjacent front leg, each of the side attachments having a side plate with the corresponding side bar and brace bar being end abutting against and fixed to the side plate and being displaced from one another at the side plate, the side plate extending between the side bar and brace bar and outwardly of each of the side bar and brace bar longitudinally of the adjacent front leg, the fasteners being received by the side plates and the adjacent legs outwardly of the side bars and brace bars, the side sections being affixed to the rear legs, respectively, each of the brace bars extending from the respective side plate to the respective lower side bar at an intersection displaced from the respective side plate, the front plates and the side plates at each of the front legs being directly opposed across the adjacent front leg.

5. The ladder rack of claim 4 further comprising at least one front crossbar extending between the front overhang sections and affixed thereto;

a mid crossbar extending between the front legs and affixed thereto, there being a plurality of attachment locations on the front legs vertically spaced.

* * * * *